(12) United States Patent
Sato et al.

(10) Patent No.: US 12,482,136 B2
(45) Date of Patent: Nov. 25, 2025

(54) REGISTRATION SYSTEM, PROCESSING DEVICE, AND PROCESSING METHOD

(71) Applicant: NEC Corporation, Tokyo (JP)

(72) Inventors: Takami Sato, Tokyo (JP); Kota Iwamoto, Tokyo (JP); Soma Shiraishi, Tokyo (JP)

(73) Assignee: NEC Corporation, Tokyo (JP)

( * ) Notice: Subject to any disclaimer, the term of this patent is extended or adjusted under 35 U.S.C. 154(b) by 811 days.

(21) Appl. No.: 17/635,467

(22) PCT Filed: Aug. 22, 2019

(86) PCT No.: PCT/JP2019/032809
§ 371 (c)(1),
(2) Date: Feb. 15, 2022

(87) PCT Pub. No.: WO2021/033309
PCT Pub. Date: Feb. 25, 2021

(65) Prior Publication Data
US 2022/0309714 A1    Sep. 29, 2022

(51) Int. Cl.
*G06T 7/00* (2017.01)
*G06V 10/14* (2022.01)
*G07G 1/00* (2006.01)

(52) U.S. Cl.
CPC ............ *G06T 7/97* (2017.01); *G06V 10/14* (2022.01); *G07G 1/0018* (2013.01); *G06T 2207/10004* (2013.01)

(58) Field of Classification Search
CPC .. G06V 10/14; G06T 7/97; G06T 7/33; G06T 2207/10004; G07G 1/0018; G07G 1/0036; G07G 1/0063; G07G 1/0045; G06Q 30/06
See application file for complete search history.

(56) References Cited

U.S. PATENT DOCUMENTS

| 4,086,476 A | 4/1978 | King |
| 4,716,281 A | 12/1987 | Macher et al. |

(Continued)

FOREIGN PATENT DOCUMENTS

| GB | 2409089 A | * | 6/2005 | ............ | A47F 9/047 |
| JP | S61-010872 B | | 3/1986 | | |

(Continued)

OTHER PUBLICATIONS

International Search Report for PCT Application No. PCT/JP2019/032809, mailed on Nov. 12, 2019.

*Primary Examiner* — Chan S Park
*Assistant Examiner* — Paulo Andres Garcia
(74) *Attorney, Agent, or Firm* — Michael Dryja (57) ABSTRACT

The present invention provides a registration system (1) including: a placement member (40) being a plate-shaped member that transmits light, or being a plate-shaped member having a hole penetrating from a front to a back; a first camera (20) that captures a product (60) placed on the placement member (40) from a front side of the placement member (40); a second camera (30) that captures the product (60) placed on the placement member (40) from a back side of the placement member (40); and a processing apparatus (10) that registers, in association with identical product identification information, a first image in which the first camera (20) captures the product (60) and a second image in which the second camera (30) captures the product (60).

4 Claims, 9 Drawing Sheets

(56) References Cited

U.S. PATENT DOCUMENTS

| | | | | |
|---|---|---|---|---|
| 8,627,946 B2* | 1/2014 | Baitz | ............... | G07G 1/0045 |
| | | | | 235/462.43 |
| 9,536,236 B2* | 1/2017 | Hay | ............... | G07G 1/0036 |
| 2006/0138220 A1* | 6/2006 | Persky | ............ | G07G 1/0036 |
| | | | | 235/383 |
| 2012/0247924 A1* | 10/2012 | Baitz | ............... | G07G 1/0045 |
| | | | | 198/606 |
| 2013/0058530 A1 | 3/2013 | Naito et al. | | |
| 2016/0171426 A1 | 6/2016 | Fujimoto et al. | | |
| 2017/0011378 A1 | 1/2017 | Inque et al. | | |
| 2017/0185985 A1 | 6/2017 | Harada et al. | | |

FOREIGN PATENT DOCUMENTS

| | | | |
|---|---|---|---|
| JP | S63-503489 | A | 12/1988 |
| JP | 2004-030409 | A | 1/2004 |
| JP | 2013-054673 | A | 3/2013 |
| JP | 2016-110537 | A | 6/2016 |
| JP | 2017-082703 | A | 3/2017 |
| JP | 2017-220198 | A | 12/2017 |
| JP | 2018-088161 | A | 6/2018 |
| WO | 2015/140855 | A1 | 9/2015 |
| WO | 2015/147333 | A1 | 10/2015 |

\* cited by examiner

| PRODUCT IDENTIFICATION INFORMATION | IMAGE IDENTIFICATION INFORMATION |
|---|---|
| 48112395 | F001~F013、C112~C181 .... |
| ⋮ | ⋮ |

REGISTRATION SYSTEM, PROCESSING DEVICE, AND PROCESSING METHOD

This application is a National Stage Entry of PCT/JP2019/032809 filed on Aug. 22, 2019, the contents of all of which are incorporated herein by reference, in their entirety.

TECHNICAL FIELD

The present invention relates to a registration system, a processing apparatus, a processing method, and a program.

BACKGROUND ART

Patent Documents 1 to 3 disclose a technique for capturing a product being an account target from a plurality of orientations by a plurality of cameras, in a technique for recognizing and registering a product being an account target, based on an image in which the product being the account target is captured and a reference image of each product being registered in advance.

Patent Document 4 discloses a technique for capturing a plurality of outer surfaces of a product being an account target by using a mirror, in the technique for recognizing and registering a product being an account target, based on an image in which the product being the account target is captured and a reference image of each product being registered in advance.

Patent Document 5 discloses a technique for associating an image generated by a camera with product identification information read by a bar code reader.

RELATED DOCUMENT

Patent Document

[Patent Document 1] Japanese Patent Application Publication No. 2017-220198
[Patent Document 2] Japanese Patent Application Publication No. 2017-62703
[Patent Document 3] Japanese Patent Application Publication No. 2016-110537
[Patent Document 4] International Publication No. WO2015/140855
[Patent Document 5] Japanese Patent Application Publication No. 2004-30409

DISCLOSURE OF THE INVENTION

Technical Problem

In the technique for recognizing and registering a product being an account target, based on an image in which the product being the account target is captured and a reference image of each product being registered in advance, in order to accurately recognize a product, a plurality of the reference images in which each product is captured from a plurality of orientations need to be registered in advance. As a means for generating such a plurality of reference images, for example, a means for performing capturing while an orientation of a product is manually changed is conceivable, but it requires extreme time and effort. None of Patent Documents 1 to 5 discloses the problem in a scene for generating a reference image.

A problem of the present invention is to achieve a technique for efficiently generating a plurality of reference images in which a product is captured from a plurality of orientations.

Solution to Problem

The present invention provides a registration system including:
a placement member being a plate-shaped member that transmits light, or being a plate-shaped member having a hole penetrating from a front to a back;
a first camera that captures a product placed on the placement member from a front side of the placement member;
a second camera that captures the product placed on the placement member from a back side of the placement member; and
a processing apparatus that registers, in association with identical product identification information, a first image in which the first camera captures the product and a second image in which the second camera captures the product.

Further, the present invention provides a processing apparatus including
registering, in association with identical product identification information, a first image in which a product placed on a placement member being a plate-shaped member that transmits light or being a plate-shaped member having a hole penetrating from a front to a back is captured from a front side of the placement member, and a second image in which the product placed on the placement member is captured from a back side of the placement member.

Further, the present invention provides a processing method including,
by a computer,
registering, in association with identical product identification information, a first image in which a product placed on a placement member being a plate-shaped member that transmits light or being a plate-shaped member having a hole penetrating from a front to a back is captured from a front side of the placement member, and a second image in which the product placed on the placement member is captured from a back side of the placement member.

Further, the present invention provides a program causing a computer to execute
processing of registering, in association with identical product identification information, a first image in which a product placed on a placement member being a plate-shaped member that transmits light or being a plate-shaped member having a hole penetrating from a front to a back is captured from a front side of the placement member, and a second image in which the product placed on the placement member is captured from a back side of the placement member.

Advantageous Effects of Invention

The present invention achieves a technique for efficiently generating a plurality of reference images in which a product is captured from a plurality of orientations.

BRIEF DESCRIPTION OF THE DRAWINGS

The above-described object, the other objects, features, and advantages will become more apparent from suitable example embodiment described below and the following accompanying drawings.

DESCRIPTION OF EMBODIMENTS

First Example Embodiment

First, an outline of a registration system according to the present example embodiment will be described. The registration system according to the present example embodiment includes a placement member, a first camera, a second camera, and a processing apparatus. The placement member is a plate-shaped member having a hole penetrating from a front to a back. The hole has a shape and a size in which a characteristic portion (portion contributing to product recognition) of a product placed on the placement member can be observed through the hole. The first camera captures a product placed on the placement member from a front side of the placement member. A first portion of the product is included in an image generated by the first camera. The second camera captures the product placed on the placement member from a back side of the placement member. A second portion of the product is included in an image generated by the second camera. Then, the processing apparatus registers, in association with the same product identification information, a first image in which the first camera captures a first product and a second image in which the second camera captures the first product.

Such a registration system according to the present example embodiment can efficiently generate a plurality of reference images in which each product is captured from a plurality of orientations.

Figure 1:
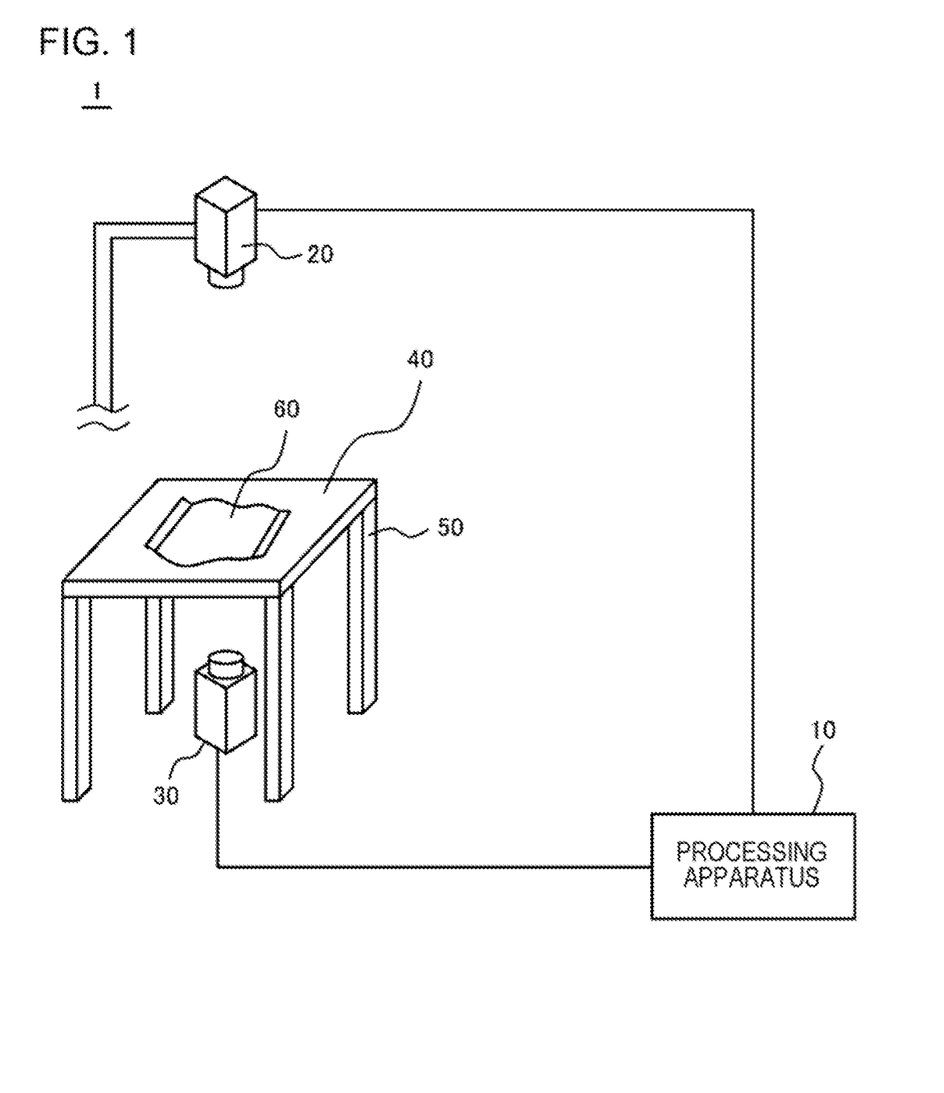
FIG. 1 is a diagram illustrating one example of an overall view of a registration system according to the present example embodiment.

Hereinafter, a configuration of the registration system will be described in detail. FIG. 1 illustrates a schematic diagram of the registration system according to the present example embodiment. Note that, the illustrated example is merely one example, which is not limited to the configuration.

As illustrated, a registration system 1 includes a processing apparatus 10, a first camera 20, a second camera 30, and a placement member 40. The registration system 1 may further include a placement table 50.

The placement member 40 is a plate-shaped member having a hole penetrating from the front to the back. The placement member 40 is installed on the placement table 50.

Figure 2:
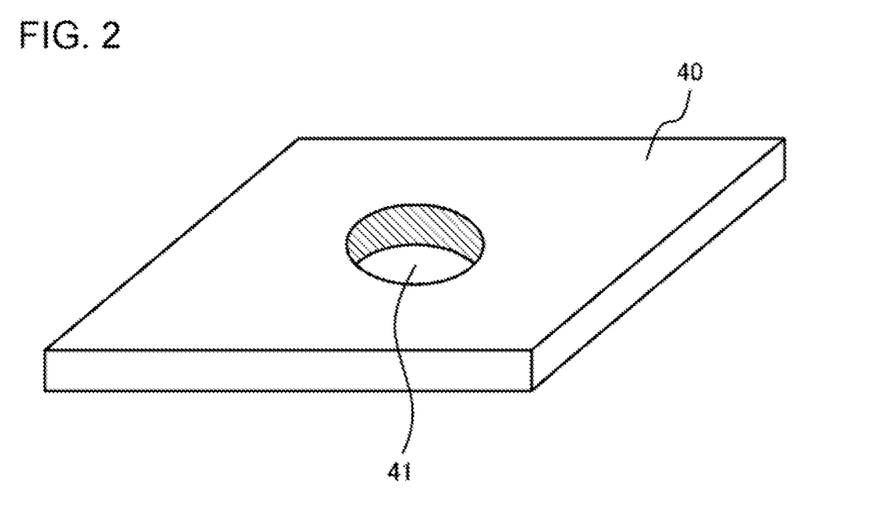
FIG. 2 is a diagram illustrating one example of a placement member according to the present example embodiment.
Figure 3:
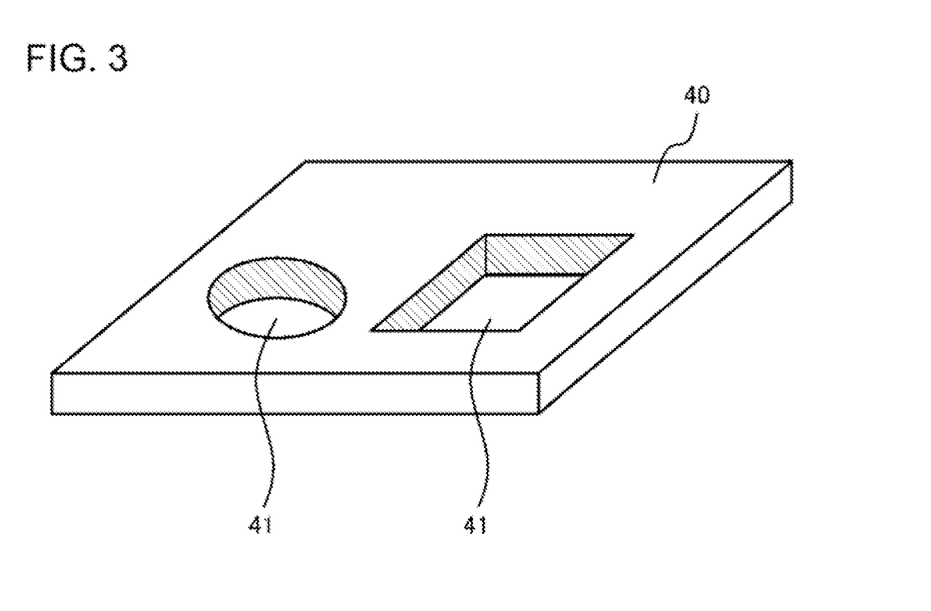
FIG. 3 is a diagram illustrating one example of the placement member according to the present example embodiment.

The hole penetrating from the front to the back has a shape and a size in which a characteristic portion (portion contributing to product recognition) of a product 60 placed on the placement member 40 in such a way as to overlap the hole can be observed from a back side of the placement member 40 through the hole. Note that, when the hole is too large, the product 60 falls from the hole, and thus a shape and a size that prevent the fall need to be set. FIGS. 2 and 3 schematically illustrate one example of the placement member 40 having a hole 41. Note that, the placement member 40 may have one hole 41 as illustrated in FIG. 2, or may have a plurality of the holes 41 as illustrated in FIG. 3.

Further, the registration system 1 may include a plurality of the placement members 40 different from each other in at least one of a shape of the hole 41, a size of the hole 41, and the number of the holes 41 as illustrated in FIGS. 2 and 3. Then, the plurality of placement members 40 may be installed on the placement table 50 in such a way that the plurality of placement members 40 are replaceable. The plurality of holes 41 provided in the plurality of placement members 40 have a shape and a size suitable for each of a plurality of kinds of the products 60. The shape and the size of the hole 41 suitable for each of the products 60 are a shape and a size in which a characteristic portion (portion contributing to product recognition) of each of the products 60 placed on the placement member 40 in such a way as to overlap the hole 41 can be observed from the back side of the placement member 40 through the hole 41, and each of the products 60 can be prevented from falling from the hole 41.

Referring back to FIG. 1, the first camera 20 captures the product 60 placed on the placement member 40 from the front side of the placement member 40. FIG. 1 illustrates one first camera 20, but the first camera 20 that performs capturing from the front side of the placement member 40 may be one or a plurality of the first cameras 20. The first camera 20 may be installed in a position and an orientation in which the product 60 placed on the placement member 40 is captured from directly above, may be installed in a position and an orientation in which the product 60 is captured from obliquely above, or may be installed in a position and an orientation in which the product 60 is captured directly from a side. The first camera 20 may capture a moving image, and generate a plurality of frame images. In addition, the first camera may generate one or a plurality of still images at a predetermined capturing timing. A first image generated by the first camera 20 is input to the processing apparatus 10.

The second camera 30 captures the product 60 placed on the placement member 40 from the back side of the placement member 40. FIG. 1 illustrates one second camera 30, but the second camera 30 that performs capturing from the back side of the placement member 40 may be one or a plurality of the second cameras 30. The second camera 30 may be installed in a position and an orientation in which the product 60 placed on the placement member 40 is captured from directly below, or may be installed in a position and an orientation in which the product 60 is captured from obliquely below. The second camera 30 may capture a moving image, and generate a plurality of frame images. In addition, the second camera 30 may generate one or a plurality of still images at a predetermined capturing timing. A second image generated by the second camera 30 is input to the processing apparatus 10.

The processing apparatus 10 registers, in association with the same product identification information (product identification information about the first product 60), the first image in which the first camera 20 captures the first product 60 and the second image in which the second camera 30 captures the first product 60. The "first image in which the first camera captures the first product 60" is an image generated by capturing the first product 60 by the first camera 20. The "second image in which the second camera 30 captures the first product 60" is an image generated by capturing the first product 60 by the second camera 30. The processing apparatus 10 includes a plurality of functional units for achieving the function.

Figure 4:
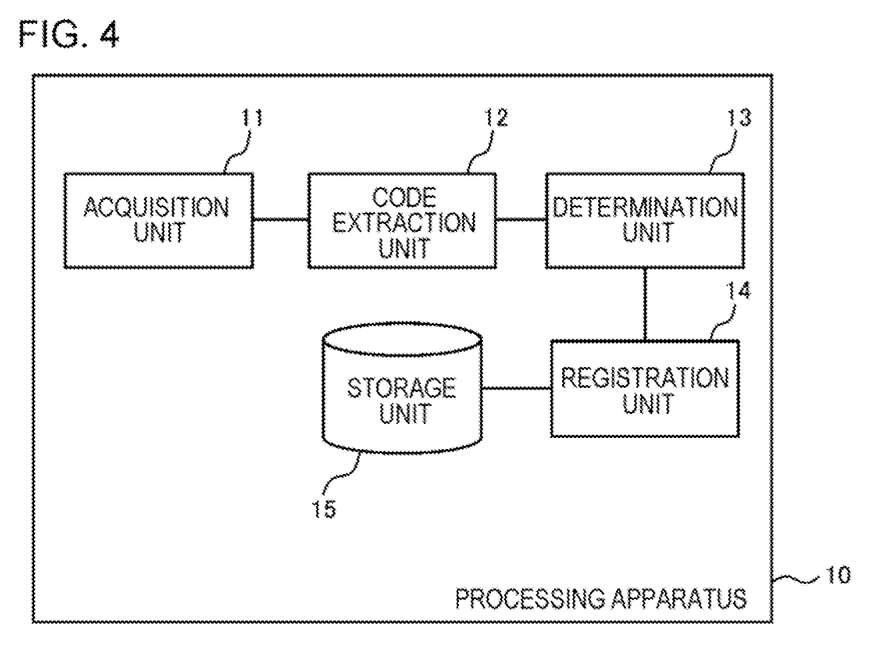
FIG. 4 is one example of a functional block diagram of a processing apparatus according to the present example embodiment.

FIG. 4 is one example of a functional block diagram of the processing apparatus 10. As illustrated, the processing apparatus 10 includes an acquisition unit 11, a code extraction unit 12, a determination unit 13, a registration unit 14, and a storage unit 15. Note that, the processing apparatus 10 may not include the storage unit 15. In this case, an external apparatus configured to be communicably connected to the processing apparatus 10 includes the storage unit 15.

Each functional unit of the processing apparatus 10 is achieved by any combination of hardware and software concentrating on as a central processing unit (CPU) of any computer, a memory, a program loaded into the memory, a storage unit (that can also store a program downloaded from a storage medium such as a compact disc (CD), a server on the Internet, and the like, in addition to a program previously stored at a stage of shipping of an apparatus) such as a hard disk that stores the program, and a network connection interface. Then, various modification examples of a method and an apparatus for achieving the functional unit are understood by a person skilled in the art.

Figure 5:
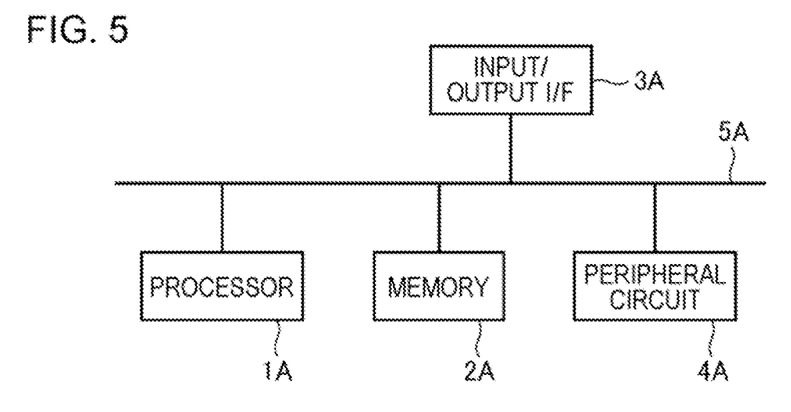
FIG. 5 is a diagram illustrating one example of a hardware configuration of the processing apparatus according to the present example embodiment.

FIG. 5 is a block diagram illustrating a hardware configuration of the processing apparatus 10. As illustrated in FIG. 5, the processing apparatus 10 includes a processor 1A, a memory 2A, an input/output interface 3A, a peripheral circuit 4A, and a bus 5A. Various modules are included in the peripheral circuit 4A. The processing apparatus 10 may not include the peripheral circuit 4A. Note that, the processing apparatus 10 may be formed of a plurality of apparatuses separated physically and/or logically, or may be formed of one apparatus integrated physically and/or logically. When the processing apparatus 10 is formed of a plurality of apparatuses separated physically and/or logically, each of the plurality of apparatuses can include the hardware configuration described above.

The bus 5A is a data transmission path for the processor 1A, the memory 2A, the peripheral circuit 4A, and the input/output interface 3A to transmit and receive data to and from one another. The processor 1A is an arithmetic processing apparatus such as a CPU and a graphics processing unit (GPU), for example. The memory 2A is a memory such as a random access memory (RAM) and a read only memory (ROM), for example. The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can output an instruction to each of modules, and perform an arithmetic operation, based on an arithmetic result of the modules.

Referring back to FIG. 4, the acquisition unit 11 acquires the first image in which the first camera 20 captures the product 60 and the second image in which the second camera 30 captures the product 60.

For example, the first camera 20 and the second camera 30 may be configured to be communicable with the processing apparatus 10 in a wired and/or wireless manner. Then, the acquisition unit 11 may acquire the first image and the second image from the first camera 20 and the second camera 30.

In addition, the acquisition unit 11 may access a predetermined storage apparatus in response to a user operation via the input apparatus included in the processing apparatus 10, and acquire the first image and the second image stored in the storage apparatus. The predetermined storage apparatus may be included in the processing apparatus 10, or may be included in an external apparatus configured to be communicable with the processing apparatus 10.

Note that, the acquisition unit 11 may edit the first image and the second image being acquired. An edit content is processing of cutting out a product region in an image, and the like. When the plurality of products 60 are included in an image, a product region can be cut out for each of the products 60. Detection of a product region can be achieved by using various image analysis means such as pattern matching.

Herein, in the present specification, "acquisition" may include "acquisition of data stored in another apparatus or a storage medium by its own apparatus (active acquisition)", based on a user input or an instruction of a program, such as reception by making a request or an inquiry to another apparatus, and reading by accessing to another apparatus or a storage medium, for example. Further, "acquisition" may include "inputting of data output from another apparatus to its own apparatus (passive acquisition)", based on a user input or an instruction of a program, such as reception of data to be distributed (or transmitted, push-notified, or the like), for example. Further, "acquisition" may include acquisition by selection from among pieces of received data or pieces of received information, and "generation of new data by editing data (such as texting, sorting of data, extraction of a part of data, and change of a file format) and the like, and acquisition of the new data".

The code extraction unit 12 extracts a code (such as a bar code, and a two-dimensional code) indicating product identification information from the first image or the second image. For example, the code extraction unit 12 can extract a code present in an image by using a technique such as pattern matching. The first image and the second image being a target of processing of extracting a code may be the first image and the second image after the edit described above by the acquisition unit 11 is performed, or may be the first image and the second image on which the edit described above by the acquisition unit 11 is not performed. When the first image and the second image after the edit are set as a processing target, a target region of processing of searching for a code by pattern matching and the like is limited, and thus a processing load on a computer is reduced.

The determination unit 13 analyzes the code extracted by the code extraction unit 12, and determines product identification information indicated by the code.

The registration unit 14 stores, in the storage unit 15, the product identification information determined by the determination unit 13, in association with the first image and the second image. The first image and the second image stored in the storage unit 15 may be the first image and the second image after the edit described above by the acquisition unit 11 is performed, or may be the first image and the second image on which the edit described above by the acquisition unit 11 is not performed.

Figure 6:
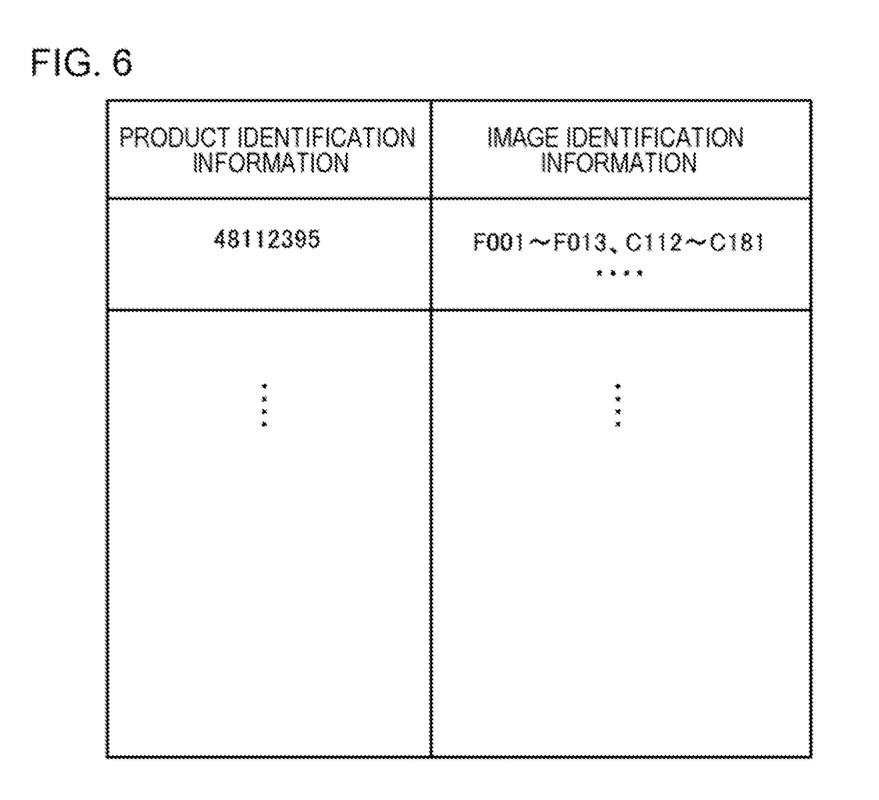
FIG. 6 is a diagram schematically illustrating one example of information processed by the processing apparatus according to the present example embodiment.

FIG. 6 schematically illustrates one example of information stored in the storage unit 15. In the illustrated example, product identification information and image identification information (for example: an image file name) that identifies the first image and the second image are associated with each other.

Figure 7:
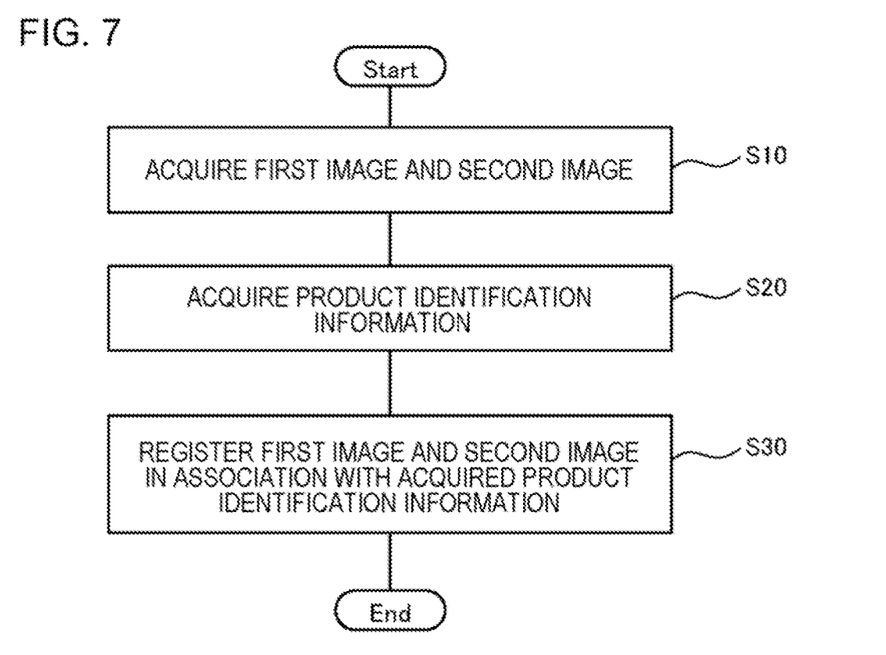
FIG. 7 is a flowchart illustrating one example of a flow of processing of the processing apparatus according to the present example embodiment.
Figure 8:
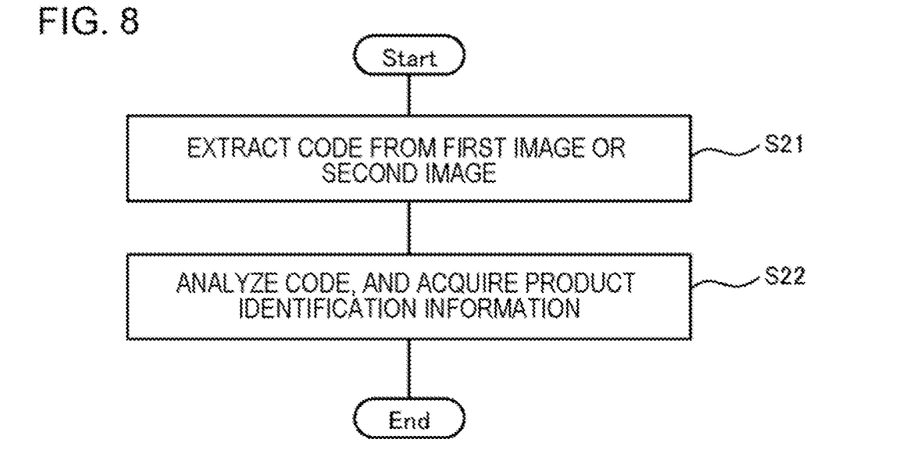
FIG. 8 is a flowchart illustrating one example of a flow of processing of the processing apparatus according to the present example embodiment.

Next, one example of a flow of processing of the processing apparatus 10 will be described by using flowcharts in FIGS. 7 and 8.

First, as illustrated in FIG. 1, for example, an operator places the first product 60 being a capturing target on the placement member 40. Then, the operator performs a capturing start input via the input apparatus of the processing apparatus 10. Then, a capturing instruction is transmitted from the processing apparatus 10 to the first camera 20 and the second camera 30. The first camera 20 and the second camera 30 capture the first product 60 in response to the capturing instruction. Then, the first camera 20 and the second camera 30 transmit, to the processing apparatus 10, the first image and the second image being generated by the capturing.

When the acquisition unit 11 of the processing apparatus 10 acquires the first image and the second image being transmitted from the first camera 20 and the second camera 30 in response to the capturing instruction described above (S10), the acquisition unit 11 forms a group of the first image and the second image, and stores the group in the storage unit 15. Note that, the acquisition unit 11 may perform editing of cutting out a product region in an image on the first image and the second image, and store, in the storage unit 15, the first image and the second image after the edit (images including only the cut portion).

Next, the processing apparatus 10 acquires product identification information about the first product 60 (S20). Specifically, as illustrated in the flowchart in FIG. 8, first, the code extraction unit 12 extracts, by using a technique such as pattern matching, a code from the first image and the second image being stored in the storage unit 15 (S21). Next, the determination unit 13 analyzes the extracted code, and determines product identification information indicated by the code (S22).

Note that, a code should be extracted from at least one image of the first image and the second image being acquired in S10 and formed into a group and product identification information should be determined, and code extraction and a code analysis do not need to be performed on all of the first image and the second image.

Referring back to FIG. 7, after S20, the registration unit 14 stores, in the storage unit 15, the product identification information acquired in S20, in association with the first image and the second image being acquired in S10 and formed into a group (S30).

Herein, a modification example will be described. The processing apparatus 10 may perform processing different from the processing illustrated in the flowchart in FIG. 8 in the processing of acquiring product identification information in S20 in FIG. 7. For example, in S20, an operator may perform an operation of causing a code reader to read a code provided with the first product 60 being a capturing target. Then, the processing apparatus 10 may acquire product identification information read by the code reader. In addition, an operator may input product identification information about the first product 60 being a capturing target via the input apparatus (such as a keyboard, a mouse, and a touch panel display) of the processing apparatus 10. Then, the processing apparatus 10 may acquire the product identification information input via the input apparatus.

As described above, the registration system 1 according to the present example embodiment described above includes the placement member 40 being a plate-shaped member having the hole 41 penetrating from the front to the back, and can capture the product 60 placed on the placement member 40 from both of the front side and the back side of the placement member 40. Such a registration system 1 according to the present example embodiment can efficiently generate a plurality of reference images in which each of the products 60 is captured from a plurality of orientations.

Further, in a case of the present example embodiment in which the product 60 is captured through the hole 41 by using the placement member 40 being a plate-shaped member having the hole 41 penetrating from the front to the back, for example, unlike a case where the product 60 is captured over a transparent plate-shaped member, reflection of light by the member does not need to be taken into consideration. Thus, the product 60 can be clearly captured relatively easily.

Herein, when the placement member 40 is formed of a plate-shaped member having the hole 41 penetrating from the front to the back, a problem that a "characteristic portion (portion contributing to product recognition) of the product 60 cannot be observed through the hole 41", the "product 60 falls from the hole 41", and the like may occur unless a shape and a size of the hole 41 are optimized. For the problem, in the present example embodiment, the plurality of placement members 40 different from each other in at least one of a shape of the hole 41, a size of the hole 41, and the number of the holes 41 are prepared, and the plurality of placement members 40 are installed on the placement table 50 in such a way that the plurality of placement members 40 are replaceable, and thus the plurality of placement members 40 can be used. Thus, the placement member 40 having the hole 41 suitable for each of the products 60 can be used during capturing of each of the products 60. As a result, the problem described above can be solved.

Second Example Embodiment

A registration system 1 according to the present example embodiment is different from that in the first example embodiment in a point that a "placement member 40 being a plate-shaped member that transmits light" is adopted instead of a "placement member 40 being a plate-shaped member having a hole 41 penetrating from the front to the back".

A plate-shaped member formed of a member that transmits light is preferably a transparent member in terms of clearly capturing a product 60 over the placement member 40. For example, the placement member 40 may be a transparent plastic plate (for example: a transparent acrylic plate), may be a transparent glass plate, or may be other.

Another configuration of the registration system 1 is similar to that in the first example embodiment.

Such a registration system 1 according to the present example embodiment achieves an advantageous effect similar to that in the first example embodiment. Further, when the "placement member 40 being a plate-shaped member having the hole 41 penetrating from the front to the back" is adopted as in the first example embodiment, the placement member 40 suitable for each product 60 needs to be used. In contrast, when the "placement member 40 being a plate-shaped member that transmits light" is adopted as in the present example embodiment, one placement member 40 can be used during capturing of a plurality of the products 60. In this way, by adopting the placement member 40 having high versatility, troublesome work of replacing the placement member 40 for each product and the like can be avoided.

Third Example Embodiment

A registration system 1 according to the present example embodiment can efficiently generate a plurality of reference images in which a product 60 is captured from a plurality of orientations by using a mirror. Details will be described below.

Figure 9:
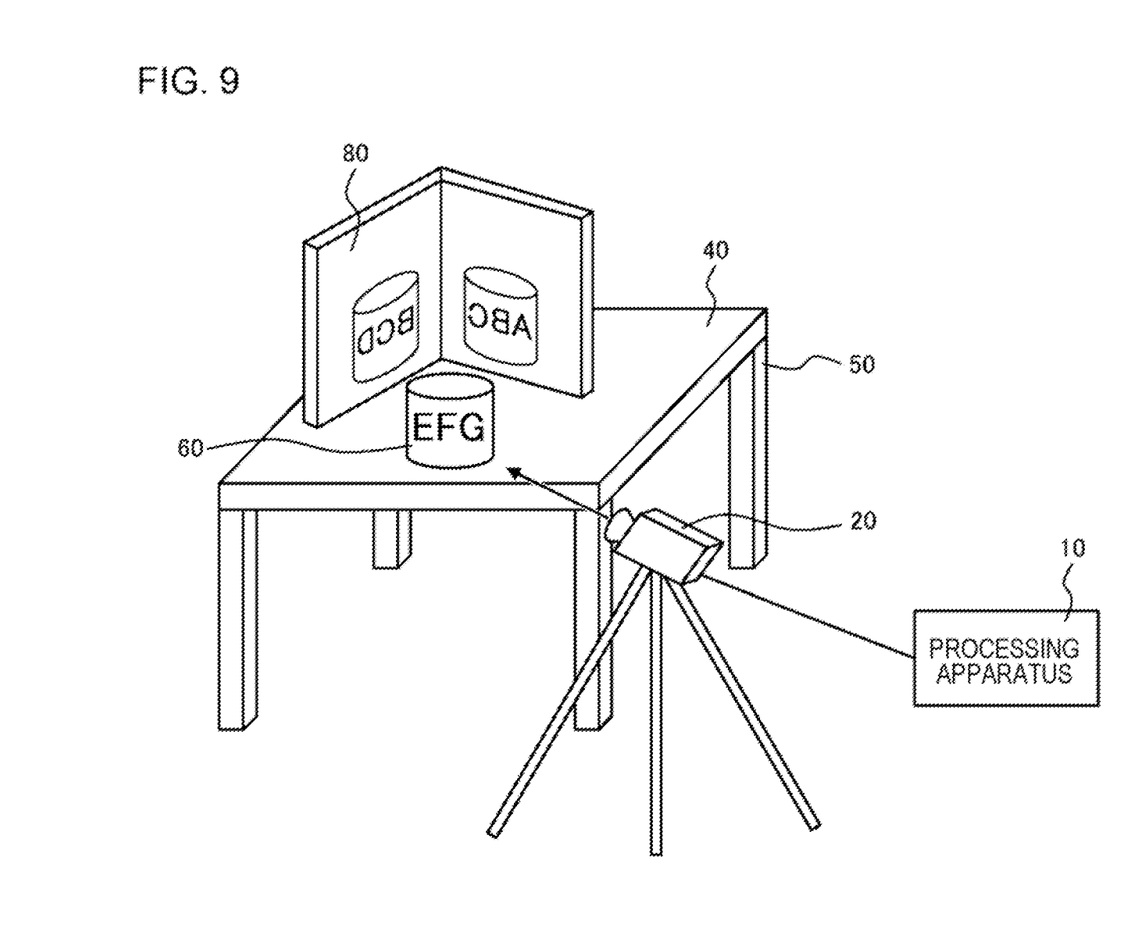
FIG. 9 is a diagram illustrating one example of an overall view of the registration system according to the present example embodiment.

As illustrated in FIG. 9, at least a part of a first camera 20 that captures the product 60 from a front side of a placement member 40 receives light that is reflected by the product 60 placed on the placement member 40 and is then reflected by a mirror 80, and generates an image. Further, at least a part of the first camera 20 receives light that is reflected by a first portion of the product 60 placed on the placement member 40 and is then reflected by the mirror 80, also receives light being reflected by a second portion of the product 60 without reflection by the mirror 80, and generates one image indicating both of the first portion and the second portion of the certain product 60. The product 60, the mirror 80, and the first camera 20 have a positional relationship and an orientation in such a way that such capturing can be performed.

Such a first camera 20 can capture the product 60 reflected in the mirror 80. Further, such a first camera 20 can simultaneously capture, by using the mirror 80, the first portion and the second portion of the product 60 that, for example, have a front-back relationship and are difficult to simultaneously capture.

A configuration of a processing apparatus 10, the placement member 40, and a placement table 50 is similar to that in the first or second example embodiment.

Note that, although not illustrated in FIG. 9, the registration system 1 can include a second camera 30. A configuration of the second camera 30 is similar to that in the first or second example embodiment.

Further, although not illustrated in FIG. 9, the registration system 1 can include the first camera 20 that captures the product 60 without using the mirror 80. A configuration of such a first camera 20 is similar to that in the first or second example embodiment.

As described above, the registration system 1 according to the present example embodiment described above achieves an advantageous effect similar to that in the first or second example embodiment. Further, the product 60 is captured by using the mirror 80, and thus a plurality of reference images in which the product 60 is captured in a plurality of orientations can be more efficiently generated.

The invention of the present application is described above with reference to the example embodiments (examples), but the invention of the present application is not limited to the example embodiments (examples) described above. Various modifications that can be understood by those skilled in the art can be made to the configuration and the details of the invention of the present application within the scope of the invention of the present application.

A part or the whole of the above-described example embodiments may also be described as in supplementary notes below, which is not limited thereto.

1. A registration system, including:
    a placement member being a plate-shaped member that transmits light, or being a plate-shaped member having a hole penetrating from a front to a back;
    a first camera that captures a product placed on the placement member from a front side of the placement member;
    a second camera that captures the product placed on the placement member from a back side of the placement member; and
    a processing apparatus that registers, in association with identical product identification information, a first image in which the first camera captures the product and a second image in which the second camera captures the product.

2. The registration system according to supplementary note 1, wherein
    the processing apparatus includes
        an acquisition means for acquiring the first image and the second image,
        a code extraction means for extracting a code indicating the product identification information from the first image or the second image,
        a determination means for determining the product identification information indicated by the extracted code, and
        a registration means for storing, in a storage means, the determined product identification information in association with the first image and the second image.

3. The registration system according to supplementary note 1 or 2, further including:
    a plurality of the placement members different from each other in at least one of a shape of the hole, a size of the hole, and a number of the holes; and
    a placement table on which the plurality of placement members are installed in such a way that the plurality of placement members are replaceable.

4. The registration system according to any of supplementary notes 1 to 3, wherein
    the first camera receives light that is reflected by the product placed on the placement member and is then reflected by a mirror, and generates an image.

5. The registration system according to supplementary note 4, wherein
    the first camera receives light that is reflected by a first portion of the product placed on the placement member and is then reflected by the mirror, also receives light reflected by a second portion of the product placed on the placement member without reflection by the mirror, and generates one image indicating the first portion and the second portion.

6. A processing apparatus, including
    registering, in association with identical product identification information, a first image in which a product placed on a placement member being a plate-shaped member that transmits light or being a plate-shaped member having a hole penetrating from a front to a back is captured from a front side of the placement member, and a second image in which the product placed on the placement member is captured from a back side of the placement member.

7. The processing apparatus according to supplementary note 6, further including:
    an acquisition means for acquiring the first image and the second image;

a code extraction means for extracting a code indicating the product identification information from the first image or the second image;
a determination means for determining the product identification information indicated by the extracted code; and
a registration means for storing, in a storage means, the determined product identification information in association with the first image and the second image.

8. A processing method, including,
by a computer,
registering, in association with identical product identification information, a first image in which a product placed on a placement member being a plate-shaped member that transmits light or being a plate-shaped member having a hole penetrating from a front to a back is captured from a front side of the placement member, and a second image in which the product placed on the placement member is captured from a back side of the placement member.

9. A program causing a computer to execute
processing of registering, in association with identical product identification information, a first image in which a product placed on a placement member being a plate-shaped member that transmits light or being a plate-shaped member having a hole penetrating from a front to a back is captured from a front side of the placement member, and a second image in which the product placed on the placement member is captured from a back side of the placement member.

What is claimed is:

1. A registration system comprising:
a placement member that is a plate-shaped member having a hole penetrating fromfront to back, the hole having a shape corresponding to a characteristic portion of a product sufficient to perform recognition of the product, the shape of and a size of the hole sufficient to prevent the product from falling through the hole when placed on the placement member;
a mirror to reflect light reflected by a first part of the characteristic portion of the product from a front side of the placement member;
a first camera disposed at the front side of the placement member to capture a first image from both the light reflected by the first part of the characteristic portion of the product and then by the mirror, and light reflected by a second part of the characteristic portion of the product from the front side of the placement member that is not reflected by the mirror;
a second camera disposed at a back side of the placement member to capture a second image from light reflected by the characteristic portion of the product from a back side of the placement member; and
a processing apparatus to:
acquire the first image and the second image;
extract a code indicating product identification information from the first image or the second image;
determine the product identification information indicated by the extracted code, and
store, in a storage unit, the determined product identification information in association with the first image and the second image.

2. The registration system according to claim 1, further comprising:
a plurality of the placement members different from each other in at least one of hole shape, hole size, and hole number; and
a placement table on which the plurality of placement members are installed such that the plurality of placement members are replaceable.

3. A processing apparatus comprising
at least one memory storing instructions; and
at least one processor configured to execute the instructions to:
acquire a first image and a second image;
extract a code indicating product identification information from the first image or the second image;
determine the product identification information indicated by the extracted code, and
store, in a storage unit, the determined product identification information in association with the first image and the second image, wherein
the first image is captured by a first camera disposed at a front side of a placement member,
the second image is captured by a second camera disposed at a back side of the placement member,
the placement member is a plate-shaped member having a hole penetrating from front to back, the hole having a shape corresponding to a characteristic portion of a product sufficient to perform recognition of the product, the shape of and a size of the hole sufficient to prevent the product from falling through the hole when placed on the placement member,
the first camera is configured to capture the first image from both light reflected by a first part of the characteristic portion of the product and then by a mirror, and light reflected by a second part of the characteristic portion of the product from a front side of the placement member that is not reflected by the mirror,
the mirror is configured to reflect the light reflected by the first part of the characteristic portion of the product from the front side of the placement member, and
the second camera is configured to capture the second image from light reflected by the characteristic portion of the product from a back side of the placement member.

4. A processing method performed by a computer and comprising:
acquiring a first image and a second image;
extracting a code indicating product identification information from the first image or the second image;
determining the product identification information indicated by the extracted code, and
storing, in a storage unit, the determined product identification information in association with the first image and the second image, wherein
the first image is captured by a first camera disposed at a front side of a placement member,
the second image is captured by a second camera disposed at a back side of the placement member,
the placement member is a plate-shaped member having a hole penetrating from front to back, the hole having a shape corresponding to a characteristic portion of a product sufficient to perform recognition of the product, the shape of and a size of the hole sufficient to prevent the product from falling through the hole when placed on the placement member,
the first camera is configured to capture the first image from both light reflected by a first part of the characteristic portion of the product and then by a mirror, and light reflected by a second part of the characteristic- portion of the product from a front side of the placement member that is not reflected by the mirror, the mirror is configured to reflect the light reflected by the first part of the characteristic portion of the product from the front side of the placement member, and the second camera is configured to capture the second image from light reflected by the characteristic portion of the product from a back side of the placement member.

* * * * *